No. 645,328. Patented Mar. 13, 1900.
J. W. PEDIGO.
SACK TYING MACHINE.
(Application filed May 20, 1899.)
(No Model.) 6 Sheets—Sheet 1.

No. 645,328. Patented Mar. 13, 1900.
J. W. PEDIGO.
SACK TYING MACHINE.
(Application filed May 20, 1899.)

(No Model.) 6 Sheets—Sheet 2.

WITNESSES:

INVENTOR
Jesse W. Pedigo
BY
ATTORNEYS

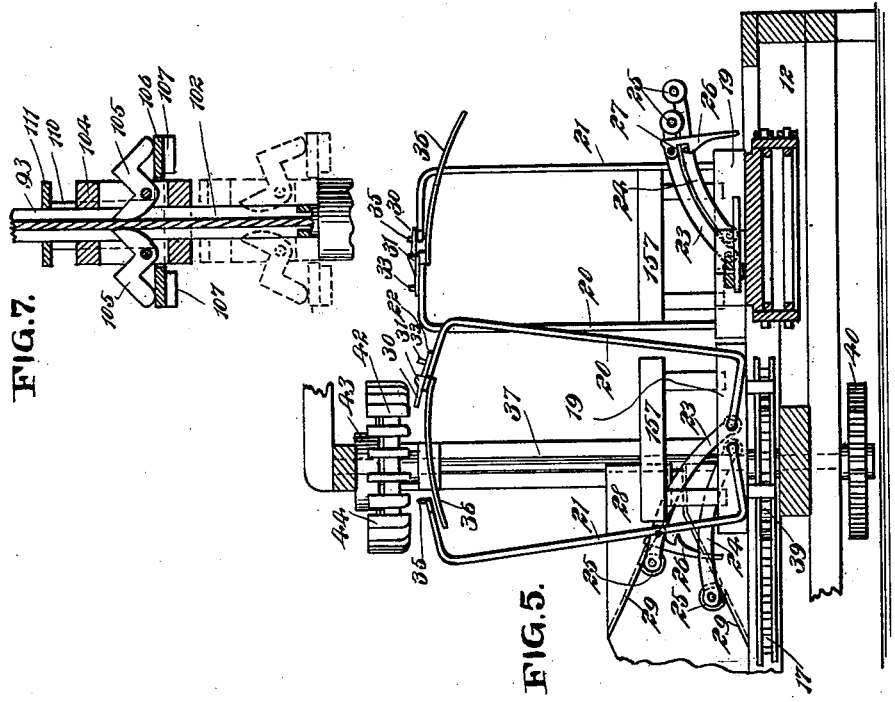

No. 645,328. Patented Mar. 13, 1900.
J. W. PEDIGO.
SACK TYING MACHINE.
(Application filed May 20, 1899.)
(No Model.) 6 Sheets—Sheet 4.
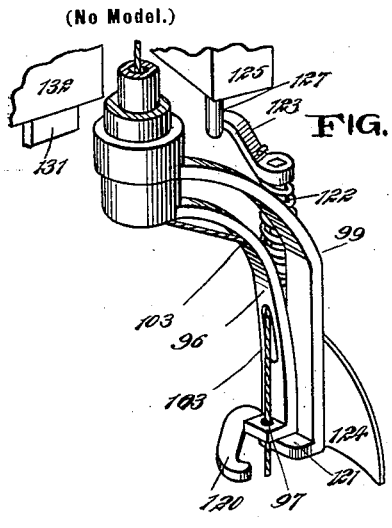
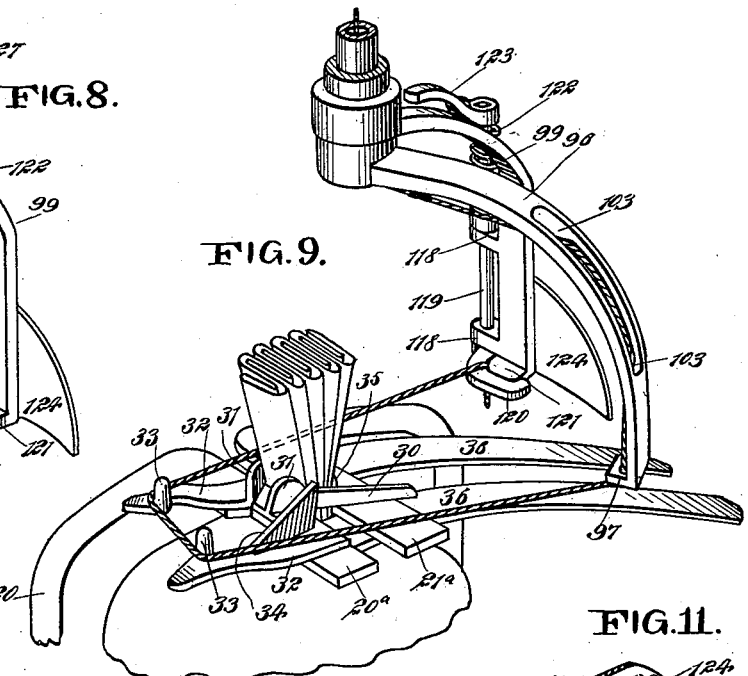
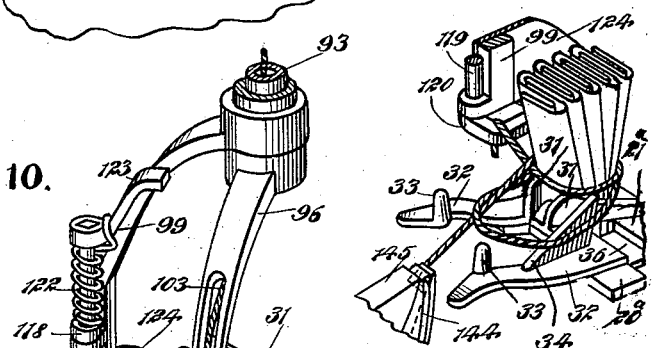
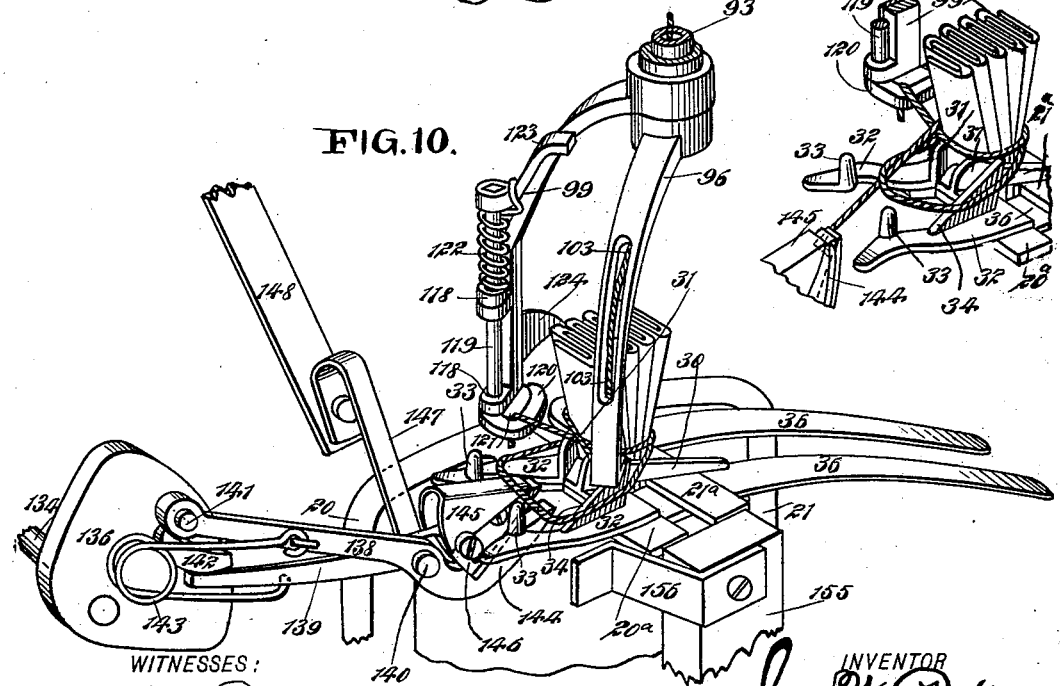

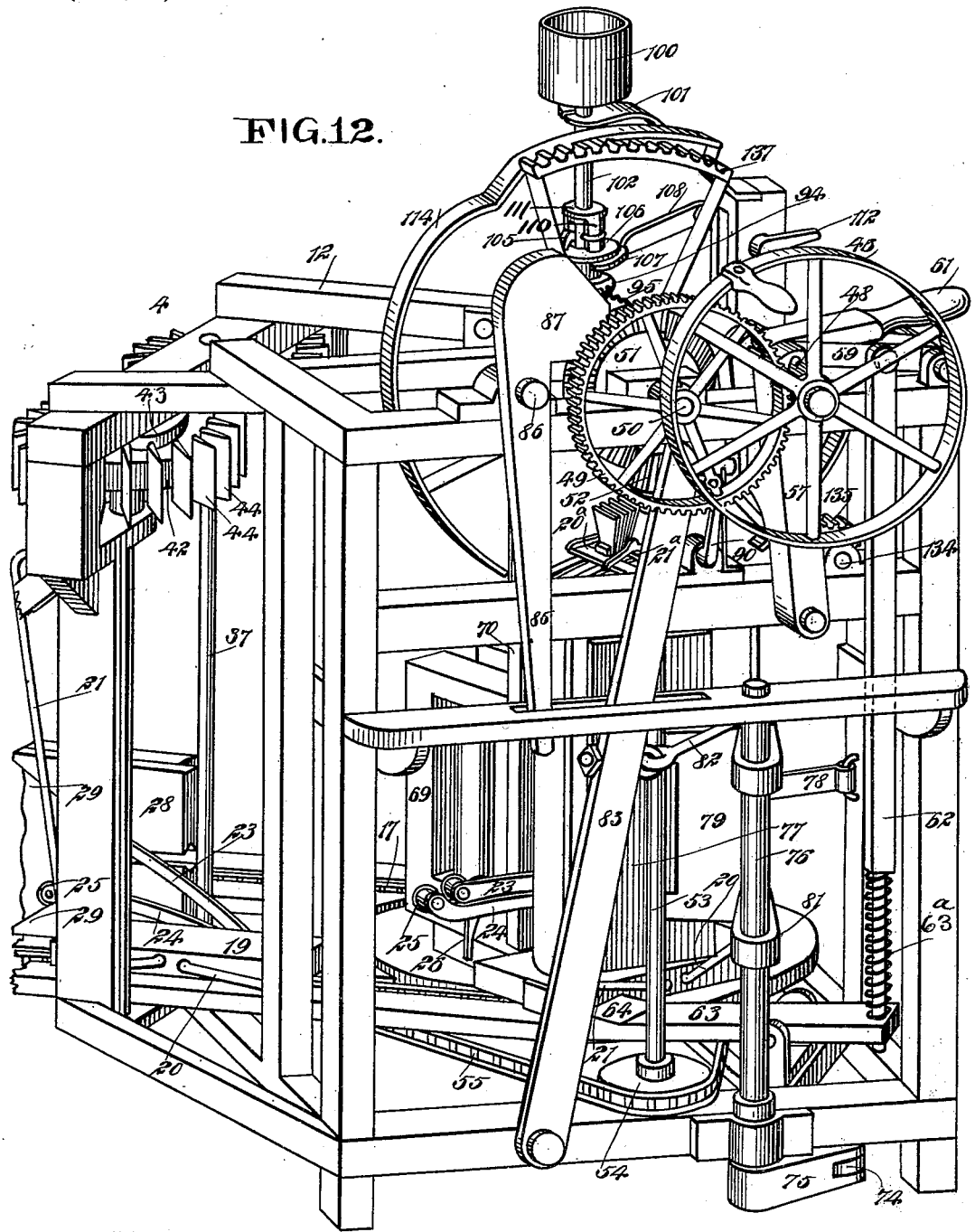

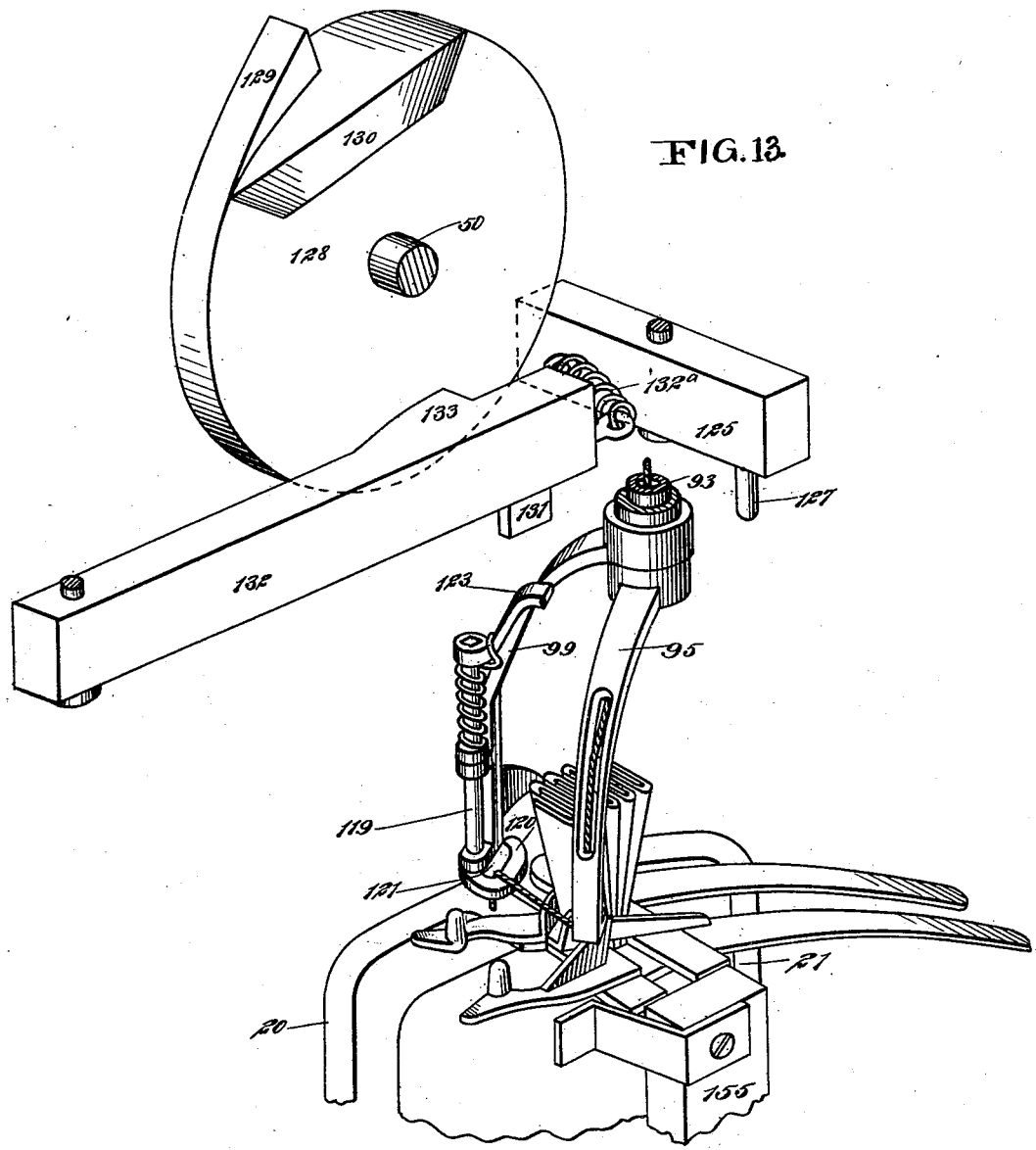

UNITED STATES PATENT OFFICE.

JESSE W. PEDIGO, OF HARRODSBURG, INDIANA.

SACK-TYING MACHINE.

SPECIFICATION forming part of Letters Patent No. 645,328, dated March 13, 1900.

Application filed May 20, 1899. Serial No. 717,653. (No model.)

*To all whom it may concern:*

Be it known that I, JESSE W. PEDIGO, of Harrodsburg, in the county of Monroe and State of Indiana, have invented a new and Improved Sack-Tying Machine, of which the following is a full, clear, and exact description.

The purpose of this invention is to provide means for tying sacks, particularly paper sacks containing flour; and to this end the invention comprises means for crimping and closing the mouth of the sack and for subsequently securing the same by knotting thread or cord around it.

This specification is the disclosure of one form of my invention, while the claims define the actual scope thereof.

Reference is to be had to the accompanying drawings, forming a part of this specification, in which similar characters of reference indicate corresponding parts in all the views.

Figure 1:
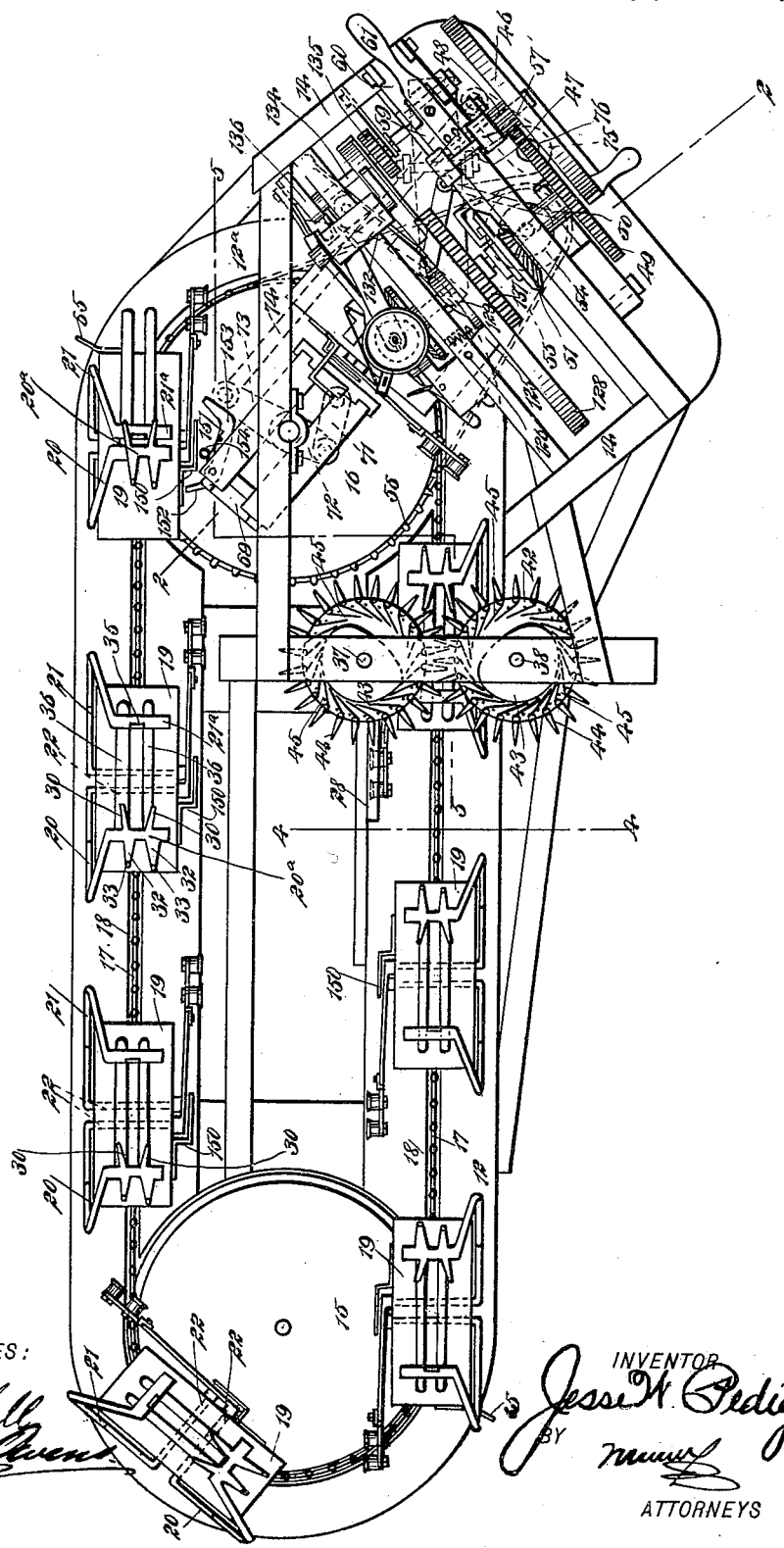
Figure 2:
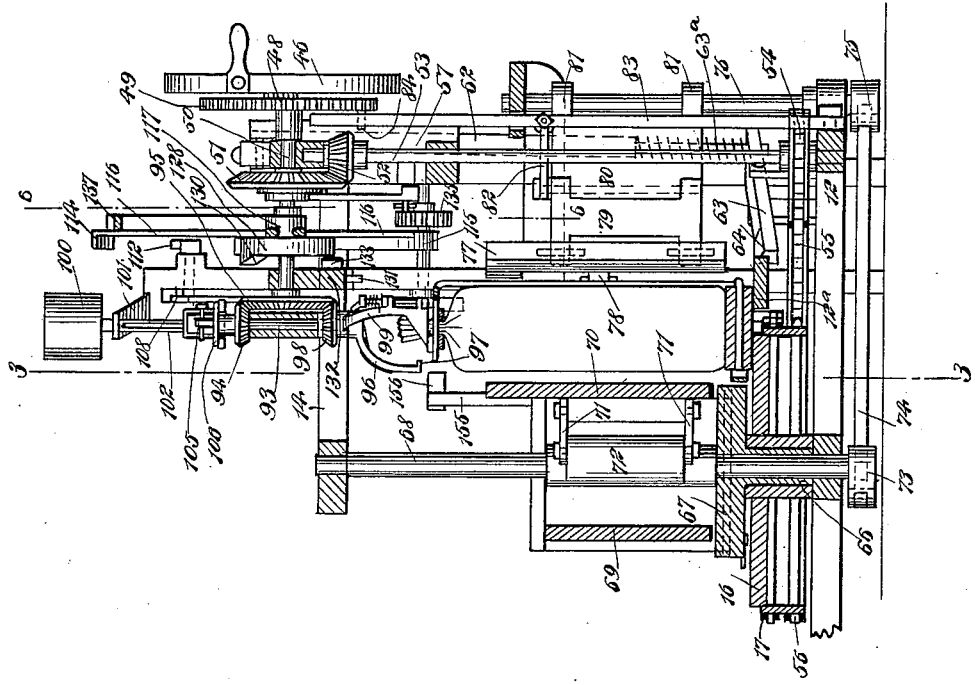
Figure 3:
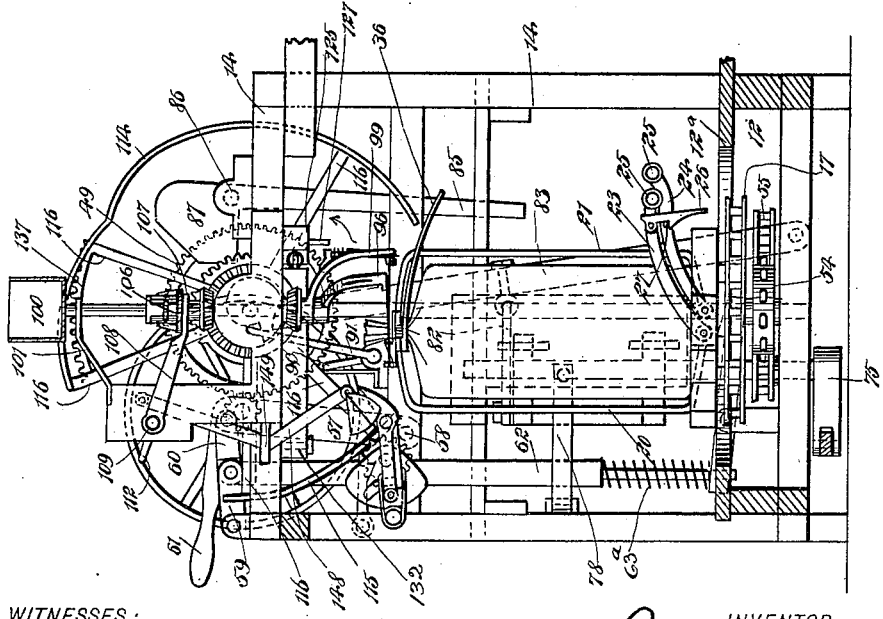

Figure 1 is a plan view of the invention. Fig. 2 is a section on the line 2 2 of Fig. 1. Fig. 3 is a section on the line 3 3 of Fig. 2. Fig. 4 is a section on the line 4 4 of Fig. 1. Fig. 5 is a section on the irregular line 5 5 of Fig. 1. Fig. 6 is a detail section on the line 6 6 of Fig. 2. Fig. 7 is a detail view of the twine-clamp for the take-up. Fig. 8 is a view of the knotter at the first stage of its operation. Fig. 9 is a view of the knotter at a succeeding stage. Fig. 10 is a view of the knotter during the action of the thread cutter and clamp. Fig. 11 is a view showing the action of the parts to bind the knot. Fig. 12 is an enlarged fragmentary perspective view of the end of the machine at which the tying operation is performed, and Fig. 13 is a fragmentary enlargement of the devices for operating the thread-clamp of the knotter.

The apparatus has an elongated horizontal base portion 12, at one end of which is a vertically-extending framework 14, which parts 12 and 14 constitute the main frame of the apparatus, it being understood that various structures and bracings may be employed to sustain the operative parts of the apparatus. The details of the frame I will not describe. I will first describe the means for holding the bags and for carrying them to and from the devices for closing and tying the same.

In the base 12 are mounted two large sheaves 15 and 16, the sheaves turning on vertical axes and having a horizontal carrier-chain 17 running over them, the parallel runs of the chain 17 passing through guide-slots 18 in the base 12. This chain 17 has connection with a number—preferably eight—of bag-carriers 19, which are attached to the chain so as to move with the same and which ride along the upper surface of the base 12. Each carrier has two arms 20 and 21, mounted to swing on horizontal pivots 22. These arms are movable to the open position shown at the left of Fig. 5 and to the closed position shown at the right of Fig. 5, such movements being effected by arms 23 and 24, respectively, fastened to the pivots 22 and carrying at their free ends rollers 25. These rollers 25 when separated, as shown at the left of Fig. 5, correspond with the open position of the arms 20 and 21 and when thrown together, as shown at the right of Fig. 5, correspond with the closed position of the arms. The arms 23 and 24 are held closed by a gravity-latch 26, pivoted to the arms 23 and engaging a pin 27 on the arm 24. The normal position of the arms 20 and 21 is the open position, as shown at the left of Fig. 5. Mounted rigidly on the base 12, adjacent to the sheave 16, is a vertical wall 28, having, as shown in Fig. 5, inclined cam-surfaces 29. This wall 28, with its cam-surfaces 29, is arranged in the path of the rollers 25 of the arms 23 and 24, so that as the carriers 19 approach the wall 28 the rollers 25 are engaged with the respective surfaces 29 and thrown toward each other, thus permitting the latch 26 to lock with the pin 27 and holding the arms 23 24 in the closed position, as shown at the right in Fig. 5. By these means the arms 20 and 21 are automatically thrown to closed position and are held in such position until released, which release is effected by means to be hereinafter described. The arm 20 has a transverse extension $20^a$ at its upper end which carries two fingers 30, projecting toward the arm 21, each finger 30 having at its inner end an upwardly-extending lug 31. (See Figs. 9 to 11.) The arm 20 also has two fingers 32 projected oppositely from the fingers 30 and formed with upwardly-extending lugs 33. One of the fingers 32 also has an upwardly-extending rib 34, with its upper edge inclined downwardly and outwardly. The arm 21 has a transverse extension 21ª at its upper end, such extension being provided with an upwardly-extending lug 35, adapted to pass between the fingers 30 of the arm 20. The arm 20 carries at its upper end two parallel bars 36, which extend toward the arm 21 and beneath the lateral extension 21ª thereof, the bars 36 serving to have the mouth of the bag fitted between them, the mouth of the bag also being fitted between the upper ends 20ª and 21ª of the arms 20 and 21. The bags to be tied are placed upon the carriages, and the mouths of the bags are projected between the bars 36 and the upper ends 20ª and 21ª of the arms 20 and 21, so that when the arms are in open position, as shown, for example, at the left of Figs. 1 and 5, the mouth of the bag will be kept open. Then when the mouth of the bag is crimped by means to be hereinafter described the arms 20 and 21 are simultaneously thrown together, thus holding the bag closed until the knotting operation is performed.

I will now describe the means for crimping and closing the mouths of the bags, as best shown in Figs. 1, 4, and 5. Two shafts 37 and 38 are mounted in suitable bearings and stand perpendicularly on the base 12 directly at the right-hand side of the before-described wall 28. The shaft 37 has a sprocket-wheel 39 engaged by one run of the chain 17, whereby the shaft 37 is driven. Below the base 12 a spur-gear 40 is fastened to the shaft 37, and this gear 40 meshes with the gear 41, fast to the shaft 38, by which arrangement the two shafts are driven in unison. The upper end of each shaft 37 and 38 carries a wheel 42, which wheels turn with the shafts and are arranged directly below the respective cams 43, which are fast to the framing and eccentric to the shafts 37 and 38. The wheels 42 carry a number of teeth 44, which are pivoted to the peripheries of the wheels and which, turning with the wheels, mesh with each other, as shown in Fig. 1, so that the mouths of the bags being passed between the wheels 42 and their teeth 44 will be crimped and drawn together in the manner shown best in Figs. 9, 10, and 11. The teeth 44 are pivotally connected with the wheels 42 for the purpose of allowing them free movement in the operations of engaging and disengaging each other, and to further facilitate these actions each tooth is provided with a finger or shank 45, which shanks bear, respectively, against the cams 43, thus causing the teeth 44 to be turned independently of the wheels 42 as the wheels are turned with the respective shafts 37 and 38. The adjustment of the cams 43 is such that as the teeth move apart at the right-hand sides of the wheels (see Fig. 1) the teeth will be allowed a greater freedom of movement than when they move together, which takes place at the left-hand sides of the wheels. (See Fig. 1.) Now as the carriers advance to the wheels 42, it being understood that the wheels are continuously in movement owing to the action of the chain 17, the mouths of the bags are passed between the wheels and between the meshes of the teeth 44, thus causing the bags to be crimped, as shown in Figs. 9, 10, and 11. Immediately upon the completion of this crimping the rollers 25 will engage with the cam-surfaces 29, and the arms 20 and 21 will be moved to the closed position. (Shown at the right-hand extremity of Fig. 1 and also shown in Figs. 9 and 10.) This will hold the mouth of the bag firmly closed and permit the cord or twine to be wrapped around the bag for fastening the same.

I will now describe the means for tying the mouths of the bags, as well as the various gearings for driving such means and the other coacting parts.

Movement is imparted to the apparatus, either manually or by other power, by means of a wheel 46, fast to a shaft 47, which carries a pinion 48, meshing with a spur-gear 49, fast to a shaft 50, mounted in the frame and carrying a mutilated miter-gear 51, meshing with a full-toothed gear 52, fast on a shaft 53, mounted vertically in the machine. The lower end of the shaft 53 carries a sprocket-wheel 54, over which passes a chain 55, such chain extending and transmitting movement to the sheave 16 by means of a sprocket-rim 56, fast to the sheave. The bevel-gear 51 is mutilated over one-half of its surface, so that although the gear turns continuously during the operation of the machine the shaft 53 is driven intermittently, thus periodically stopping the movements of the sheaves 15 and 16 and the chain 17, and consequently the movement of the bag-carriers and the bag-crimping wheels 42. The shaft 47 is mounted in a fork 57, pivoted at its lower end to the frame 14 at the point 58, as best shown in Fig. 3. This fork is connected with two toggle-links 59 and 60, one link being pivoted to the fork and the other link to the frame 14. The link 59 carries a handle 61, so that by raising the handle 61 the shaft 47, with the fork 57, may be thrown to the right, (see Fig. 1,) thus disengaging the gear 48 from the gear 49, by which means the whole apparatus may be thrown into and out of gear whenever desired. The pivot between the toggle-links 59 and 60 is connected with a rod 62, which extends downward to the bottom of the machine and is there projected through the outer end of a short lever 63, the lower portion of the rod being reduced and carrying at such portion an expansive spring 63ª, bearing between the rod and the lever to constitute a cushioned connection between them. The inner end of the lever 63, as best shown in Fig. 2, has an inclined or cam-like portion 64 juxtaposed to the semicircular extension 12ª of the base 12 of the apparatus. When the end of the lever 63 having the cam 64 is depressed, the rod 62 through the medium of the spring 63ª is thrown upward and the toggle formed by the links 59 60 is broken, thus disengaging the gears 48 and 49 and stopping the operation of the machine.

I preferably provide eight carriers 19, and, as will be fully described hereinafter, I prefer to stop the operation of the machine as every fourth carrier passes the knotting devices, so that the tied bags may be lifted from the carriers. To attain this end, I provide every fourth carrier with a spur 65, which spurs project laterally from the rear ends of the respective carriers and are adapted to ride over the cams 64, thus throwing the cams downward and causing the toggle formed by the links 59 and 60 to be broken, which stops the operation of the machine and permits the attendant to lift off of the machine the four bags which have just been tied. Then by forcing the handle 61 downward, so as to again engage the gear 48 with the gear 49, the operation of the machine may be again started.

The sheave 16, as shown in Fig. 2, turns loosely around a sleeve 66, forming a part of the rigid framing and carrying at its upper end a cross-head 67, also rigid with the framing. A shaft 68 is mounted loosely in the sleeve and also in the upper portion of the framing 14. Sliding on the cross-head 67 is a casing 69, the inner wall of the casing being formed by a vertically-elongated plate 70, adapted to press against one side of the bag to shape the same, as indicated best in Fig. 2. The casing 69 has two links 71 pivoted thereto, and these links are also pivoted to a crank-arm 72, fast to the shaft 68. As the shaft 68 rocks in its bearings the shaft transmits to the casing 69 a sliding movement on the cross-head 67, such movement being effected by means of the crank-arm 72 and links 71. The lower extremity of the shaft 68 is provided with a crank-arm 73, to which is pivoted a link 74, this link passing transversely to the right-hand side of the machine, where it is pivoted to a crank-arm 75, fast to a rock-shaft 76, mounted vertically in the right-hand extremity of the frame. (See Figs. 1, 2, and 12.) For pressing the side of the bag opposite to the plate 70 of the casing 69 I provide a presser-plate 77, movably supported on the frame by means of a link 78 and pivoted to a toggle member 79. The toggle member 79 is pivoted to a similar member 80, having extensions 81 passing around and firmly secured to the shaft 76. A link 82 is pivoted to the pivot between the toggle members 79 80, and this link is also pivoted to a lever 83, fulcrumed on the base 12 of the apparatus and passing upwardly to and alongside of the inner side of the gear-wheel 49. The gear-wheel 49 has a pin 84, adapted to engage with the lever 83 and to throw the lever to the right. (See Fig. 2.) In the action of the parts the gear 49 turns in the direction of the arrow shown in Fig. 3, and the pin on the gear engages the lever 83 and throws the lever away from the toggle members 79 and 80. (See Fig. 3.) This movement of the lever 83 through the medium of the link 82 causes the toggle formed by the members 79 and 80 to be straightened or expanded and throws the presser-plate 77 to the left, (see Fig. 2,) thus causing the presser-plate 77 to engage the bag in opposition to the presser-plate 70. The movement of the toggle members 79 and 80 causes the shaft 76 to be rocked, and this shaft through the medium of the link 74 and cranks 73 and 75 rocks the shaft 68 and also operates the presser-plate 70, which operation is simultaneous with that of the plate 77. Therefore the action of the lever 83 throws the parts 70 and 77 toward each other to engage and shape the sides of the bag. Now for returning such elements to their inactive position I provide a lever 85, fulcrumed at the point 86 (best shown in Figs. 3 and 12) and having a head 87 projected alongside of the inner side of the gear 49 and adapted to be engaged by the pin 84. The lower end of the lever 85 projects downward into proximity with the lever 83, so that as the pin 84 of the gear 49 engages the head 87 of the lever 85 the lower end of the lever will be thrown toward and engage with the lever 83 and throw said lever toward the members 79 and 80, which will be in reverse of the movement of the lever 83, previously described, and which will therefore break the toggle and return the elements 70 and 77 to their normal or inactive position. These operations go on continuously during the movement of the machine, and the plates or walls 70 and 77, moving against the opposite sides of the bags, serve to give the bags a proper form.

Pivoted to the left-hand portion of the casing 69 (see Fig. 1) is a dog 151, which has an end 152 at the left and an end 153 at the right, such ends being bent approximately transversely to the main portion and the former extending into the path of shoes 150, fastened to the carriers 19. The dog 151 is pressed to the position shown in Fig. 1 by a spring 154, and when one of the carriers approaches the dog, so that the shoe 150 engages the end 151 of the dog, the dog is thrown so that the end 153 engages with the latch 26 of the arms 23 and 24, thus releasing said latch and permitting the arms 20 and 21 to move apart to open position. The carriers are advanced to a point between the shaper-plates 70 and 77, and then by the action of the mutilated gear 51 the carriers are respectively stopped long enough to permit the tying operation to be performed. This tying operation is effected by the action of the shaft 50, which turns continuously with the gear 49. When the mutilated gear 51 ceases to turn the gear 52, it is desirable to lock the gear 52, so as to prevent idle movement of any of the parts tending to disarrange them. This is effected by a bolt 88, pressed into engagement with the gear 52 by means of a spring 89. An elbow-lever having two arms 90 and 91 is mounted on the frame 14 and arranged with its short arm 90 in engagement with the spring 89 and with its long arm 91 working against a cam 92, fast to the shaft 50. When the teeth of the gear 51 mesh with those of the gear 52 to turn the gear 52, the cam 92 serves to throw the arm 91 of the elbow-lever to the left, (see Fig. 6,) thus throwing the spring 89 to the left and withdrawing the bolt 88 from the gear 52, so as to permit the gear to turn; but when the teeth of the gear 51 cease to engage the gear 52 the cam 92 serves to permit the spring 89 to return the bolt 88 and the connected parts to the right, thus engaging the bolt with the gear 52 to stop the action of said gear.

Mounted in a part rigid with the frame 14 is the hollow knotter-shaft 93, which extends vertically and carries a bevel-gear 94, fast thereto and driven by a similar gear 95, fast to the shaft 50. The lower end of the knotter-shaft 93 carries a finger 96, terminating in an eye 97, through which the twine is passed, as shown in Fig. 8 and as will be further described hereinafter. Mounted loosely on the lower portion of the shaft 93, just above the finger 96, is a collar carrying a bevel-gear 98 and also carrying a finger 99, the details of which will be hereinafter described. The gear 98 meshes with the gear 95, and by this arrangement the fingers 96 and 99 are driven simultaneously in opposite directions, reference to Figs. 8, 9, 10, and 11 showing that the finger 99, being longer than the finger 96, is arranged to turn outside of said finger 96.

The twine is mounted in a canister 100, supported on the upper end of the shaft 93 and turning with the same, the upper extremity of the shaft being steadied by a bearing-arm 101, fast with a portion of the frame. The shaft 93 at points between the gear 94 and the arm 101 is formed with a longitudinal slot 102 therein. The cord or twine is passed from the canister 100 downward through the hollow shaft 93, through eyes 103 in the finger 96, to the eye 97 in said finger. As best shown in Fig. 7, the shaft 93 at the point of the slot 102 thereof carries a weighted sleeve 104, in which are pivoted two dogs 105. The dogs 105 have their heads projecting into the slot 102 of the shaft 93, and the shanks of the dogs project outward from the shaft and bear on a ring or annulus 106, which is supported by the fork 107 of an arm 108, fast to a short shaft 109, mounted in a part of the framing 14. The annulus 106 also carries two upwardly-extending arms 110, joined at their tops to a crown-plate 111, through which passes the shaft 93. As shown in Fig. 7, the take-up device occupies normally the position shown by dotted lines, in which the sleeve 104 bears on the top of the gear 94 and the dogs 105 are thrown outward to permit the thread to pass freely through the hollow shaft 93. When, however, the arm 108 is raised to the position indicated by the full lines in Fig. 7, (the fork 107 being shown in said view,) the sleeve 104 drops relatively to the annulus 106, and by this action the dogs 105 are thrown inward, so that the heads of the dogs grip on the thread and the thread is drawn up through the shaft 93, thus providing the necessary take-up for the thread, as will be fully described hereinafter.

For the purpose of actuating the arm 108 in proper time with the other parts of the binding machinery I fasten to the shaft 109 a short crank 112. This crank is adapted to be engaged by two cam-rims 114 and 115, such rims being fastened by spokes 116 to a hub 117, fast on the shaft 50. As the shaft 50 turns, the cam-rims 114 and 115 are moved therewith, and such rims engaging with the crank 112 serve to rock the shaft 109, thus raising the arm 108 and permitting the same to be lowered by the gravity thereof and by the gravity of the take-up device. The cam-rims, as shown in the drawings, are so timed that they will actuate the arm 107 at the proper time, so as to feed the thread to the knotting devices properly during the operation thereof.

As shown best in Figs. 8, 9, 10, and 11, the knotting-finger 99 has two bearing-lugs 118 formed thereon, in which a rock-shaft 119 is mounted, such shaft moving with the finger 99 and having a clamp 120 at its lower end, the clamp working with a projection 121, formed on the lower end of the finger 99, to clamp the thread between them, as shown in Figs. 9, 10, and 11. The upper end of the shaft 119 carries a torsional spiral spring 122 and also a short arm 123. The finger 99 is further provided with a shoe 124, projecting laterally therefrom, which serves to prevent the cord when looped to form the tie from becoming entangled with the finger 99, as will be explained in the description of the tying operation to come hereinafter. The spring 122 tends to throw the shaft 119, so that the clamp 120 will be closed against the projection 121, thus clamping the thread therein. Now for the purpose of throwing the shaft 119 to open the clamp 120 I provide a lever 125, pivoted to the frame 114 at the point 126 (see Fig. 1) and having a pin 127 at its free end, such pin projecting downward from the lever. (See Figs. 8 and 13.) Fastened to the shaft 50 is a wheel 128, with two cams 129 and 130 formed thereon, the cam 129 acting with the lever 125 to move the same horizontally on its fulcrum, thus throwing the free end of the lever 125 to the position shown in Fig. 8 and placing the pin 127 in the path of the arm 123, so that as the finger 99 moves past the lever 125 the shaft 119 will be rocked to throw open the clamp 120 and permit the cord or twine to be moved into the clamp to be held between the same and the projection 121 as soon as the arm 123 passes from the pin 127. By these means the clamp is operated to receive and to become engaged with the twine before the knot is tied in the bag. After the knot is tied it will be necessary to disengage the twine, which I effect by means of a lug 131, fast to a lever 132, (see Figs. 1, 2, 8, and 13,) fulcrumed on the frame 14 and having a lateral projection 133, extending into proximity with one side of the wheel 128, so that the cam 130 thereof when engaging with the projection 133 will throw the lever 132 out of its normal position and into the path of the arm 123, the timing of the parts being such that this movement of the lever 132 will take place exactly when the knot has been tied in the thread, or, in other words, at a period immediately following the period upon which the parts assume the position shown in Fig. 11. The levers 132 and 125 are held in the normal position by a retractile spring 132$^a$, bearing between them. (See Fig. 13.) The shaping plate or wall 70 has an upper extension 155, to which is fastened a lug 156, projecting inwardly. The extension and lug are shown in Figs. 2 and 10. As shown in Fig. 5, the arms 20 and 21 of the carrier move to the position there illustrated during the tying of the knot, and when in this position the carrier stops, the lug 156 projects toward the ends of the arms 20 and 21, as shown in Fig. 10, to engage said ends and to stop the movement of the carrier at the proper time. This lug 156 also serves to steady the parts during the knotting operation.

I provide means for cutting the thread and for drawing the same taut to bind the knot, which means comprise a shaft 134, mounted in the frame and carrying at one end a pinion 135 and at the other end a segmental plate 136. Fastened to the cam-rim 114 and supported on the spokes 116 thereof is a toothed sector 137, which is adapted to engage with the pinion 135 to impart thereto a complete revolution. The segmental plate 136 carries the thread cutting and clamping device, which comprises two sections 138 and 139, pivoted to each other at the point 140. The section 138 is pivoted to the plate 136 on a pin 141, and the section 139 has its inner end working on a cam 142, fast to the plate 136. The two sections are held together at their inner ends by means of a spring 143, bearing against the respective sections, as shown best in Fig. 10. The sections 138 and 139 form shears or nippers, the section 138 having a ledger-blade 144 and the section 139 having a hood 145 and a blade 146, the blade 146 moving past the ledger-blade 144 and the hood 145 being adapted to move over the ledger-blade 144 to form therewith a clamp in which the end of the thread is held. For the purpose of supporting the nippers or shears in their proper position I provide a link 147, pivoted to the nippers at the point 140 and connected with an elbow-link 148, which passes upward through a guide 149 and which is pivoted at its upper end to an upward extension of the frame 14.

In the operation of tying the knot, as illustrated in Figs. 8, 9, 10, and 11, the fingers 96 and 99, the former carrying the thread in its eye 97, are moved to the position shown in Fig. 8, in which position the lever 125, actuated by the cam 129, is moved to throw the pin 127 into engagement with the arm 123, thus throwing the shaft 119 so as to open the clamp 120. The finger 99 is moved so that the clamp 120 engages the thread, and simultaneously with this action the pin 127 disengages the arm 123, whereupon the spring 122 throws the clamp 120 to closed position, as shown in Fig. 9, thus gripping firmly the end of the twine. The movement of the fingers 96 and 99 now continues, the fingers moving, as before described, in opposite directions. Simultaneously with this action one of the carriages containing a bag, the mouth of which has been crimped and the arms 20 and 21 being closed upon it, as shown in Fig. 9, advances toward the knotter and is timed to pass between the fingers 96 and 99 when these fingers have each performed a little more than a half-revolution, so that the studs 33 of the fingers 32 of the arm 20 of the particular carrier concerned will engage with the thread and stretch the same around the mouth of the bag, as shown in Fig. 9. The fingers 96 and 99, moving continuously, immediately pass from the position just referred to and assume that shown in Fig. 9 and continuing from that position perform each an additional half-revolution to the position shown in Fig. 10, whereupon two hitches are thus formed around the mouth of the bag, the first hitch taking in the lugs 33 of the fingers 32 and the last hitch lying snugly around the mouth of the bag. When these operations have been completed, it will be necessary to sever the hitches or loops from the standing part of the twine and to draw the twine to tighten or bind the knot. This operation is effected by the shears or nippers above described. When the parts assume the position shown in Fig. 10, the mechanism, such being properly timed, operates to turn the plate 136 so that the nippers or shears are advanced and moved upward between the fingers 32 and inside of the lugs 33, the hood 145 engaging the loop that embraces the lugs 33 and throwing such loop off the lugs. Almost simultaneously with this operation the nippers engage the standing part of the twine directly adjacent to the eye 97 of the finger 96 and simultaneously sever the thread and clamp the same between the hood 145 and the ledger-blade 144. This being effected, the return movement of the nippers begins, the nippers drawing with them the recently-severed end of the thread and passing it through the first hitch or loop of the knot, which has just previously been started from its position over the lugs 33, and the finger 99, continuing its movement and being yet engaged with the other end of the thread, draws upon the said end, and by this joint action of the nippers and fingers 96 99 the whole fabric is tightened or bound into a knot. This tie is known to riggers as a "clove-hitch" and serves securely to hold the mouth of the bag. Immediately subsequent to this tightening operation of the knot the fingers 96 and 99 continue their movement and return to their position, (shown in Fig. 8,) whereupon they will be ready for a second operation. The cam 142 on the plate 136, acting with the section 139 of the nippers or shears, serves to move said section, with the ledger-blade 146 and the hood 145, so as to effect the various operations described, such operations also including the release of the end of the twine as the shears or nippers return from the position shown in Figs. 10 and 11. The finger 99, bearing the shoe 124, passes over the fingers 32 immediately upon or just prior to the movement of the nippers upward to throw the first-formed loop off the lugs 33 and bind the knot or tie, and the purpose of this shoe is to prevent the possible entanglement of such first-formed loop when started from lugs 33 with the finger 99.

Having described the constructions and functions of the several elements of my invention, I will now proceed to trace the general operations of the machine.

The bags having been filled are placed upon the successive carriers and the wheel 46 is started to revolution. The chain 17, turning in the channel 18 of the base 12, advances the carriers to the crimping-wheels 42, which crimp the mouths of the bags, and simultaneously the wall 28, with its cam-surfaces 29, closes the arms 20 and 21, thus closing up the mouth of the bag. This is effected without arresting the movement of the chain 17, and the carriers continue their advance movement until the first carrier assumes a position between the plates 70 and 77, whereupon the gear 51, being so timed, ceases to engage with the gear 52, and the movement of the chain 17, and consequently of the carriers, ceases. The shaper plates or walls 70 and 77 now operate to engage with the sides of the bag and shape the same in the manner shown in Figs. 2 and 3. The shaft 50, continuing to revolve, drives the knotting devices and the knot is tied during the one-half revolution of the shaft 50. The gear 51 now runs back into mesh with the gear 52 and the chain 17 is again set in motion, thus causing the carriers to resume their operation. As the carriers approach the rear end of the casing 69 the shoes 150 of the carriers engage with the end 152 of the dog 151, thus throwing the end 153 of said dog into engagement with the latch 26 to release the latch and permit the arms 20 and 21 to swing to open position by force of gravity. As every fourth carrier passes the cam 64 of the lever 63 the shoe or spur 65 of said fourth carrier depresses the cam and throws the lever to the position shown in Fig. 2, thus throwing up the rod 62 and breaking the toggle formed by the links 59 and 60. This disengages the gear 48 from the gear 49 and stops the operation of the machine, so that the attendant may now remove the four carriers that are loaded with bags that have been tied and may replace said carriers with untied bags. Then by pressing down the handle 61 the toggle formed by the links 59 and 60 may be again extended and the machine again thrown into gear.

If it be desired to tie bags of different heights, the bags, if too short, may be raised to the proper height by means of stools or supports 157, which may be rested on the carriers proper to form an elevated part thereof.

Having thus described my invention, I claim as new and desire to secure by Letters Patent—

1. In a bag-tying machine, the combination of bag-holding devices grasping the mouth of the bag and holding it closed during the tying operation, and bag-tying devices comprising means carrying the thread to wrap the same in loops around the mouth of the bag, and also comprising means for disposing the thread and for drawing on the same to contract the loops and form the knot.

2. The combination with a framing, of a bag-carrier mounted to move thereon, means for closing the mouth of the bag, and means for wrapping and tying a thread around the mouth of the bag, the bag-carrier moving first to the closing means and then to the wrapping and tying means.

3. The combination with a framing, of an endless connection mounted to move thereon, a bag-carrier attached to the connection and driven thereby, means for closing the bag, and means for wrapping and tying a thread around the mouth of the bag, the carrier moving the bag first to the closing means and then to the wrapping and tying means.

4. The combination with a framing adapted to have bags moved over the same, of means for crimping and closing the mouths of the bags, and means for wrapping and tying a thread around said mouths, the bags being moved first to the closing means and then to the tying means.

5. The combination with a framing, of a bag-carrier adapted to move thereon, two opposing parts, one of which is a movable arm pivoted to the carrier and adapted to engage the mouth of a bag, means mounted on the framing for crimping the mouth of the bag, means for throwing the arm of the carrier to hold the mouth of the bag in crimped or closed form, and knotting devices for tying the bags.

6. The combination with a framing, of a bag-carrier mounted to move thereon, two opposing parts one of which is a swinging arm mounted on the carrier, crimping devices adapted to engage the mouth of the bag, to crimp the same, and means for throwing the said movable arm to hold the mouth of the bag crimped.

7. The combination with a framing, of a bag-carrier adapted to be moved over the same, wheels geared with each other to turn in unison and between which the mouth of the bag is passed, and teeth mounted to swing on the wheels and to engage the mouth of the bag, to crimp the same.

8. The combination with a base, of a bag-carrier adapted to be moved over the same, arms extended upward from the carrier and adapted to swing on the carrier to hold the mouth of the bag between them, additional arms respectively in connection with the first-named arms, and cam-surfaces mounted on the framing and engaged by the said additional arms, to throw the said first-named arms.

9. The combination with a framing, of two wheels mounted thereon and adapted to have the mouth of a bag passed between them, and teeth mounted loosely on the wheels and projecting therefrom to mesh with each other, the teeth serving to crimp the mouth of the bag to close the same.

10. The combination with a framing, of means for carrying a bag, arms mounted on said means and adapted to compress the mouth of the bag between them, and means for crimping the mouth of the bag so that the bag when crimped, is compressed between the arms.

11. The combination with a framing, of crimping devices mounted thereon, a bag-carrier adapted to move the bag to said crimping devices, arms mounted to move on the bag-carrier, and means for moving the arms to close the mouth of the bag immediately upon the crimping thereof.

12. In a knotting apparatus, the combination of two fingers adapted to turn oppositely upon a common center, and a combined knife and clamp adapted to engage one end of the thread, to sever the same and to draw it through a loop formed by the fingers, whereby to tighten the knot.

13. In a knotting device, the combination of two fingers adapted to turn on a common center, the fingers moving oppositely to wrap the thread around the article to be tied, and means for drawing one end of the thread through a loop formed by the fingers to tighten the knot.

14. In a knot-tying device, the combination of two fingers adapted to turn oppositely on a common axis, to wrap a thread around the article to be tied, and means for tightening the thread to complete the knot.

15. In a knotting device, the combination of means for holding the article to be tied, such means comprising two fingers each with an upwardly-projected lug thereon, two fingers adapted to turn oppositely on a common axis to wrap the thread around the article to be tied, the lugs of the first-named fingers serving to engage one of the loops formed by the thread-fingers, a combined knife and clamp serving to sever one end of the thread and to draw the same through said loop, and means for disengaging the said end from the clamp.

16. In a knotting apparatus, the combination of means for holding the article to be tied, such means comprising a lug, thread-carrying fingers adapted to turn oppositely on a common axis to wrap a thread around the article to be tied, the thread-carrying fingers serving to engage one loop on the thread with the said lug, a combined knife and clamp serving to sever one end of said thread and to draw the same through the said loop, and means for disengaging the said end from the clamp.

17. In a knotting apparatus, the combination of two thread-carrying fingers adapted to turn oppositely to wrap a thread around the article to be tied, and means for drawing one end of the thread through a loop thereof to tighten the knot.

18. In a knotting device, the combination of two fingers adapted to move oppositely to wrap a thread in loops around the article to be tied, and means for drawing one end of the thread through one of said loops to tighten the knot.

19. In a binding and tying apparatus, the combination of a swinging finger serving to carry the thread and turning around the article to be tied, to wrap the thread in loops around and bind the same, and means for drawing one end of the thread through one of the loops formed by the finger.

20. In a binding and tying apparatus, the combination of swinging means adapted to carry the thread and to turn around the article to be tied to wrap the thread in loops around and bind the same, a clamp adapted to engage the thread and draw one end of the same through one of the loops to bind the knot, and means for disengaging the clamp.

21. In a knotting apparatus, the combination of a means carrying the thread swinging around the article to be tied to wrap the thread in loops around the same, and means for drawing on the thread to contract the loops thereof and form the knot.

22. In a knotting device, the combination of a swinging finger adapted to turn completely around the article to be tied and to wrap the end of the thread in loops around the same, a knife serving to sever the standing part of the thread after the end is wrapped around the article to be tied, and means for drawing on the thread to contract the loops thereof and form the knot.

23. In a bag-tying apparatus, the combination with a frame and with knotting devices, of two rock-shafts, a toggle in connection with one of the rock-shafts, a shaping-plate in connection with the toggle, means for imparting movement to the toggle to operate the shaping-plate, a connection between the two shafts to drive the second shaft from the shaft with which the toggle is connected, a crank on the said second shaft, and a second shaping-plate in connection with the crank and operated thereby simultaneously with the first-named shaping-plate.

24. In a bag-tying apparatus, the combination with a frame and with knotting devices, of two shaping-plates juxtaposed to the knotting devices and adapted to engage opposite sides of the bag, and means for operating said plates simultaneously.

25. In a bag-tying machine, the combination with bag closing and tying devices, of two shaping-plates mounted on the machine and adapted to engage opposite sides of the bag to shape the same, and means for operating the plates simultaneously.

26. The combination with a frame, of two shaping-plates adapted to engage a bag to shape the same, a toggle connected with one plate to move the same, a shaft with which one member of the toggle is connected, means for operating the toggle, a second shaft, a connection between the two shafts, a crank attached to the second shaft, and a connection between the crank and one of the said shaping-plates.

27. The combination of a rotary shaft, a mutilated gear fast thereon, a second rotary shaft, a gear mounted on the second shaft and coacting with the mutilated gear to be periodically turned thereby, a cam attached to the first-named shaft and turning therewith, a pawl tending to lock the second gear, and a connection between the pawl and said cam for controlling the pawl, the cam being timed to release the pawl as the mutilated gear meshes with the gear on the said second shaft.

28. In a feed mechanism for knotting and tying machines, the combination of a swinging arm, an annulus carried thereon and moved thereby, a hollow slotted knotter-shaft, a sleeve mounted loosely in the annulus and having limited sliding movement on the shaft, and gripping-dogs mounted in the sleeve and working in the slotted knotter-shaft and engaging the annulus to lift the sleeve and dogs with the annulus and to cause the dogs to move together to grip the thread.

29. The combination of a hollow slotted knotter-shaft through which the thread is passed, a sleeve mounted loosely on the shaft, a dog mounted in the sleeve and adapted to engage with the thread through the slot in the knotter-shaft to clamp the thread, an annulus loosely encircling the sleeve and engaging the shank of the dog to actuate the dog, and means for raising and lowering the annulus.

30. The combination with a hollow slotted knotter-shaft through which the thread is adapted to be passed, of a member mounted to slide thereon, a dog carried by said member and moving through the slot in the knotter-shaft to coact with the thread, a second member relatively movable with the first and engaging the dog to actuate the same, and means for raising the two members, such means engaging the second member.

31. The combination of a hollow knotter-shaft, a thread-finger attached to said shaft, the thread passing through the knotter-shaft and being engaged with the finger, and a take-up device working on the knotter-shaft.

32. The combination of a hollow knotter-shaft through which the thread is passed, a thread-arm attached to and turning with the shaft and having the thread engaged therewith, a take-up device sliding on the shaft and the shaft having a slot therein permitting the take-up to engage with the thread, and means for operating the take-up in time with the operation of the thread-finger.

33. The combination of a hollow knotter-shaft, knotting devices in connection therewith, the thread being passed through the knotter-shaft, a take-up device mounted on the shaft and the shaft having a slot therein permitting the take-up device to engage with the thread in the knotter-shaft, means in connection with the take-up to raise the same, and a cam-rim driven in the vicinity of the said means and engaging the same to operate the take-up.

34. The combination of two thread-carrying fingers adapted to turn oppositely, one finger having an eye through which the thread is passed, a clamp mounted on the other finger, means for operating the clamp to engage and release the thread, and a combined knife and nipper adapted to sever one end of the thread and to draw the same through a loop formed by the fingers to tighten the knot.

35. The combination of two thread-carrying fingers adapted to turn oppositely to wrap the thread loosely around the article to be tied, a clamp mounted on one of the fingers, an arm in connection with the clamp to transmit operative movement thereto, two levers mounted in the vicinity of the fingers and having projections adapted to engage with the arm of the clamp automatically to operate the clamp, means for operating said levers and means for engaging one end of the thread, to draw the same through a loop formed by one of the fingers, whereby to tighten the knot.

36. The combination of two fingers adapted to turn and to carry the thread in loops around the article to be tied, a clamp mounted on one of the fingers to hold the thread, means for automatically operating the clamp, and a combined knife and nipper adapted to sever one end of the thread and to draw the same through a loop formed by one of the fingers.

37. In a knotting apparatus, means for severing and drawing the thread, comprising a shaft, a member mounted eccentrically on the shaft to turn therewith, two nipper-sections, one being pivoted to the said member, a cam on the said member with which the other section engages, and a knife carried by the one of the nipper-sections and working against the other section of the nipper, the said two sections forming a clamp to engage and hold the thread.

JESSE W. PEDIGO.

Witnesses:
WINEPORK KINSER,
FRANK A. DOUB.